(12) United States Patent
Larimer (10) Patent No.: US 7,712,906 B1
(45) Date of Patent: May 11, 2010

(54) MACRO FLASH ADAPTER

(76) Inventor: Roy Larimer, 374 White Oak Dr., Palmyra, VA (US) 22963

( * ) Notice: Subject to any disclaimer, the term of this patent is extended or adjusted under 35 U.S.C. 154(b) by 2 days.

(21) Appl. No.: 11/773,299

(22) Filed: Jul. 3, 2007

Related U.S. Application Data (60) Provisional application No. 60/806,723, filed on Jul. 6, 2006.

(51) Int. Cl.
*G03B 15/02* (2006.01)
*F21V 7/04* (2006.01)

(52) U.S. Cl. .......................... 362/16; 362/11; 362/554; 396/164

(58) Field of Classification Search ............... 362/3, 362/8, 11, 16, 17, 18, 551, 554, 581; 396/164, 396/175, 176, 198, 199, 155
See application file for complete search history.

(56) References Cited

U.S. PATENT DOCUMENTS

| | | | | | |
|---|---|---|---|---|---|
| 3,278,739 | A | * | 10/1966 | Royka et al. ................. | 362/554 |
| 4,129,898 | A | * | 12/1978 | Ohrstedt ......................... | 362/7 |
| 4,268,141 | A | * | 5/1981 | Mori et al. ................... | 396/162 |
| 4,428,029 | A | * | 1/1984 | Baliozian ...................... | 362/12 |
| 6,430,371 | B1 | * | 8/2002 | Cho ............................. | 396/176 |
| 7,127,163 | B2 | * | 10/2006 | Lee et al. ...................... | 396/198 |
| 2005/0265707 | A1 | * | 12/2005 | Chang ........................ | 396/199 |

\* cited by examiner

*Primary Examiner*—Jong-Suk (James) Lee
*Assistant Examiner*—David R Crowe
(74) *Attorney, Agent, or Firm*—Hoffberg & Associates (57) ABSTRACT

A light guide adapter for a camera stroboscopic illuminator, comprising a removable mounting adapted to adhere to an unmodified on-camera stroboscopic illuminator; and at least one flexible light guide, connected to the mounting, having an entrance aperture positioned to receive light from the stroboscopic illuminator, each light guide having a self-supporting, independently positionable exit aperture distal from the entrance aperture.

18 Claims, 6 Drawing Sheets

MACRO FLASH ADAPTER

FIELD OF THE INVENTION

The present information relates to the field of stroboscopic flash photography, and more particularly to the field of macro or micro photography, wherein a system and method is provided which allows uniform illumination of a small object close to the camera lens.

BACKGROUND OF THE INVENTION

It is well known in the field of macro photography that when using flash lighting, standard on-camera and built-in flash units are not suitable. Typically, these flash units are located distant from the lens, and in fact are intentionally displaced in order to reduce "red eye". Likewise, the flash has a parallax with respect to the lens, resulting in a distinct shadowing for objects close to the lens. Finally, due to the uneven illumination, automatic exposure algorithms may fail.

In a macro photographic environment, the lens of the camera is usually very close to the subject, and depending on the desired magnification, may be from less than one inch up to a distance of 24 inches. Typical macro flash units used include ring light flash units that attach to the front of the camera lens, and single or twin flashes mounted off the camera and connected to the camera via an electronic cord or an IR communication port. Two (or more) point sources of light are much preferred in macro photography because at close working distances associated with macro photography a single point source causes contrasting shadows.

U.S. Pat. No. 6,402,358 (Larimer), expressly incorporated herein by reference, discloses a flash system which employs fiber optic illumination to allow precise control and positioning of a light source, suitable for macro photography. See: U.S. Pat. No. 4,006,487 (Allen); U.S. Pat. No. 4,065,859 (Mecklenborg); U.S. Pat. No. 4,428,029 (Baliozian); U.S. Pat. No. 4,464,705 (Horowitz); U.S. Pat. No. 4,519,684 (Francis, Jr. et al); (U.S. Pat. No. 4,575,208 (King); U.S. Pat. No. 5,029,309 (Jones); U.S. Pat. No. 5,034,761 (Jones); and U.S. Pat. No. 5,860,850 (Larimer), each of which is expressly incorporated herein by reference.

See also:

Gilman, "Photo Slit Lamp Biomicrography";
    webeye.ophth.uiowa.edu/ops/op-photo/slitlamp/slitlamp.htm.

"Fiber Optic Illuminator Research Project"; eetd.161.gov/btp/fiberoptics.html.

"Fiber Optic Illuminator;" www.wpiine.com/wpi/microscopycameras/fo illuminator.html.

"Long-Life Fiber Optic Illuminator".

"Fiber Optic Lighting Systems: An Overview"; www.fiberstars.com/overview.html.

"Fiber Optic Systems"; eande.lbl.gov/R-LabDG/help3503.htm.

"Fostecfiber Optic Bundles with Halogen Light"; www.subtechnique.com.

"Fiber Optic flux Calculation"; eande.lbl.gov/R-Lab DG/Help 3503.htm.

"NAVITAR CCTV Lens Accessories and Fiber Optic Lighting";
    www/subtechnique.com/noframes/navitar/oem/vlac-c.htm.

"140 Most Advanced Fiber Optic Illuminators";
    www.kentscientific.com/99WebCatalog/140.html.

"Fiber Optic Bundles"; www.perkinelmer.com/opto.111.

In order for a modern film or digital camera to utilize its through-the-lens light metering system (TTL) it must communicate electronically to the flash unit. This means that each camera manufacturer has dedicated flash units that will operate on specific cameras. Not all manufacturers that produce standard flash units for their cameras also make special macro flash units, although some alternate suppliers may provide TTL compatible flash units. The less advanced consumer cameras often have only a built in flash and therefore are not able to be used in a macro environment.

SUMMARY OF THE INVENTION

The present invention provides a system and method which allows a user to convert or adapt a single standard on-camera or built-in flash into a multi point source macro flash unit, that does not interfere with the camera's ability to communicate electronically with its flash.

The present invention therefore allows a user to employ an existing stroboscopic illuminator (flash) for macrophotography, without requiring acquisition or transport of a second flash system.

A first embodiment of the present invention comprises one or more light guides, e.g., fiber optic conduits. These light guides are interfaced to the normal exit aperture (typically the front) of the camera's electronic flash unit, in such a way as to collect the light from the flash when fired. Because of the generally close working distances and small objects to be illuminated, a degree of inefficiency and light loss is acceptable, while permitting high quality illumination and easy usage. Typically, a light transmission efficiency of greater than 1% is sufficient, since the exit aperture is typically close to the lens, and the flash provided is sufficiently bright to illuminate subjects 2-4 meters from the lens at a wide angle setting.

The exit apertures of the light guide(s) are held adjacent to the camera lens, near the front of the lens, and are positioned as necessary to properly illuminate the subject, while outside of the field of view. When the camera is in auto exposure mode, the camera reads the amount of light it receives through the lens during exposure, and sends a signal to the flash unit electronically adjusting the amount of light to obtain the correct exposure.

A plurality of light guides also divide the light from a single source into multiple sources, each of which may provide point, line, area, etc., illumination. For example, in some cases, a controlled side or angle illumination may be useful to generate shadow contrast of surface details. In other cases, separate control of foreground and background illumination is desired. The balance of light between the sources may be adjusted by providing irises, or shutters. For example, if the light guide is formed of multiple thin fiber optics, the arrangement of fibers between input and output may be randomized, allowing a simple displaceable shield at the input to control an amount of light entering the bundle, which will then be relatively evenly distributed in the output. The respective positions of the shields for each bundle will determine the illumination ratio. Alternately, instead of a shield, a displaceable gradient density filter may be provided to vary the amount of light entering or leaving a bundle.

Another advantage of the present invention is that it has a very small footprint at the lens, enabling a photographer to position the camera lens in otherwise tight spaces. Thus, the light guide allows a physical displacement of the flash tube from the object being illuminated.

In a second embodiment, small laser pointers (e.g., visible red LED lasers) are affixed to the ends of the fiber optic light guides, to aid the photographer in aiming the output of the light guide. The laser axis is therefore aligned with the axis of the light guide, and the displacement kept low. It is also possible to couple a laser to a fiber optic, providing a laser output within or in the center of a fiber optic bundle. If desired, a lens or holographic filter may be provided in front of the laser, to disperse the laser to show, for example, the bounds of the light guide illumination. In addition, it is possible to use different colored lasers for the different light guides, to allow independent adjustment without ambiguity.

Alternately, or in addition, a modeling light may similarly be provided as a white light emitting diode (LED) having an illumination pattern similar to that of the stroboscopic light guide output. Various colored LEDs may also be used to distinguish the respective sources. (The LEDs may also be used to illuminate the subject directly, but available white LEDs typically have poorer color balance than a xenon flash). The LEDs may also illuminate the subject through the same fiber optic bundles, either through the same fibers, or through separate fibers interspersed or bundled with the fibers which carry the stroboscopic illumination. In some cases, the subject may be fluorescent, in which case it may be advantageous to provide an ultraviolet emitting LED to stimulate emissions; and indeed, the LED output may continue through the stroboscopic illumination. LED illumination prior to exposure may also excite phosphorescent emissions.

According to a further embodiment, an illumination source may be provided at the mounting to illuminate the on-camera flash tube window. The result of this is that the light is reflected back, off the rear reflector, and into the entrance apertures of the optic conduits, and hence to the exit apertures, to illuminate the subject. In this way, even when the flash tube is not illuminated, an optical output is emitted by the light guides, in generally the same pattern as the stroboscopic illuminator would produce. Thus, a modeling light is provided to permit composing of the photograph and focusing (or autofocusing) of the lens.

It is further possible to use both a primary and secondary flash in conjunction with or alternate to each other; that is, a light guide is provided from the primary flash as the primary source, and the an independent output is provided by another illumination source, which is controlled in dependence on the primary illumination source output. Thus, for example, an LED light source (secondary) may be driven as a slave from the normal flash (primary). The normal flash controls the timing (initiation, duration) of the flash pulse(s) of a secondary illuminator. In this embodiment, it is possible to avoid the light conduit altogether, since a photodetector may be placed directly over the primary flash to receive the timing information, which is then used to electronically drive the secondary illuminator, e.g., LEDs. Typically, a secondary illuminator is not necessary, and a passive light guide, such as a fiber optic illumination cable, is a preferred embodiment.

According to a preferred embodiment, the stroboscopic flash is a separate unit from the camera, which may be a through-the-lens viewing single lens reflex digital camera. The flash, similar to on-camera units, has a rectangular window in front of a xenon stroboscopic flash tube, which is in turn in front of a reflective surface to reflect light emitted from the rear of the tube through the window. A mask is provided which covers the window, and which is typically opaque to prevent light from being emitted through the mask. The mask has a set of apertures, e.g., three apertures, each adapted to position and hold a ferrule of a fiber optic bundle in place. The entrance face of each fiber optic bundle is held against a portion of the rectangular window, facing the tube. As noted above, the flash typically has surplus illumination, and therefore a high efficiency of light capture from the flash is not necessary, and thus a relatively small capture area (e.g., 10% of the window area for each bundle) is adequate. However, if necessary, various known means may be used to improve capture efficiency without departing from the spirit and scope of the invention. Preferably, the flash unit is not permanently modified, and the mask may be removed from the window for normal use of the flash, e.g., for non-macro photography. Therefore, one preferred way to hold the mask in place during use is through hook-and-loop (statistical) fasteners, which may be attached to the mask and flash unit outside of the window area.

The fiber optic bundles, which are, for example, 3-18 inches long, have an exit aperture which is positioned to illuminate the subject. Since the subject is presumably small and close to the lens, the exit apertures are preferably held close, adjacent to the lens, with their tips outside the field of view but perhaps extending in front of the most-forward lens element. For example, a ring is provided which mounts to the lens barrel (e.g., through the filter thread) which has a set of apertures. The ferrule of a respective fiber bundle surrounding the exit aperture may then be inserted into one of the apertures. There may be, for example, three fiber optic bundles, and three sets of three holes, spaced in groups at 120 degrees about the ring. Within a group, one hole has an axis parallel to the lens axis, one has an axis converging with the optical axis in front of the lens at an angle of 12 degrees, and one has an axis converging with the optical axis in front of the lens at an angle of 24 degrees, permitting the user to select the angle of incidence of the light as may be appropriate for front or side (angled) illumination.

It is therefore an object of the invention to provide a light guide adapter for a camera system comprising a lens and a stroboscopic illuminator having an illumination port, comprising a mounting adapted to be removably positioned at the illumination port, at least one flexible light guide, connected to said mounting, having an entrance aperture positioned to receive light from the illumination port, each light guide having an independently positionable exit aperture distal from the entrance aperture adapted for illuminating a region proximate to the lens, and a positioning fixture to maintain the exit aperture of the at least one light guide in a user-selectable position with respect to the lens. The at least one flexible light guide preferably comprises a fiber optic bundle. The positioning fixture may be associated with the at least one flexible light guide, in the form of self-supporting shell, to maintain a position of the exit aperture against gravitational forces. The mounting may be mounted to the stroboscopic illumination port using an adhesive, magnets, hook-and-loop fastener, suction device, or other means. The stroboscopic illuminator may be of an on-camera type of separate flash unit type.

The at least one flexible light guide may comprises at least two flexible light guides, each connected to the mounting plate and having an entrance aperture positioned to receive light from the illumination port, further comprising at least one light modulator to vary a relative amount of light passing through the at least two flexible light guides, such as a neutral density filter or iris, which may be positioned at the entrance or exit of the light guides, for example.

An auxiliary illuminator may also be provided, for providing illumination in a region proximate to the lens independent of, or dependent on, an output of the stroboscopic illuminator output.

According to a preferred embodiment, the at least one flexible light guide comprises three flexible light guides, the entrance apertures of which are arranged in a row across the mounting, such that each entrance aperture intersects a portion of the illumination port.

The system may further comprise a modeling light associated with each flexible light guide, to demonstrate an illumination region of the stroboscopic illuminator output passing through the flexible light guide. Alternately or in addition, the system may comprise a modeling light associated with the mounting, to produce a continuous light pattern at the exit aperture of each flexible light guide approximating a region of illumination produced by a stroboscopic flash of the stroboscopic illuminator.

It is also an object of the invention to provide a light guide adapter for a camera having a lens and a stroboscopic illuminator, comprising a removable mounting adapted to be affixed to a flat surface representing a stroboscopic illuminator output; at least one flexible light guide, connected to said mounting, having an entrance aperture positioned to receive light from the stroboscopic illuminator output, each light guide having an independently positionable exit aperture distal from the entrance aperture, and being adapted to illuminate a region proximate to the lens, the flexible light guide maintaining an illumination region under gravitational influences after positioning. The system may further comprise a continuous illumination source associated with the removable mounting, for illuminating the stroboscopic illuminator, wherein light is reflected by a reflector and enters the entrance aperture of the at least one flexible light guide. The continuous illumination source, for example, may comprise a white light emitting diode. One or more continuous illumination sources may also be provided which associated with the exit aperture, for illuminating at least one of a center and a range of the illumination region. In this case, continuous means that the output is perceptually maintained for a period of time relatively long with respect to movements of objects being illuminated, which is in contrast with a strobe, which has an output which is relatively short with respect to movements of objects being illuminated.

These and other objects will become apparent from a review of the Drawing and the Detailed Description of the Preferred Embodiments.

BRIEF DESCRIPTION OF THE DRAWING

The invention will now be described with reference to the accompanying drawing, in which.

DETAILED DESCRIPTION OF THE PREFERRED EMBODIMENT

Figure 1:
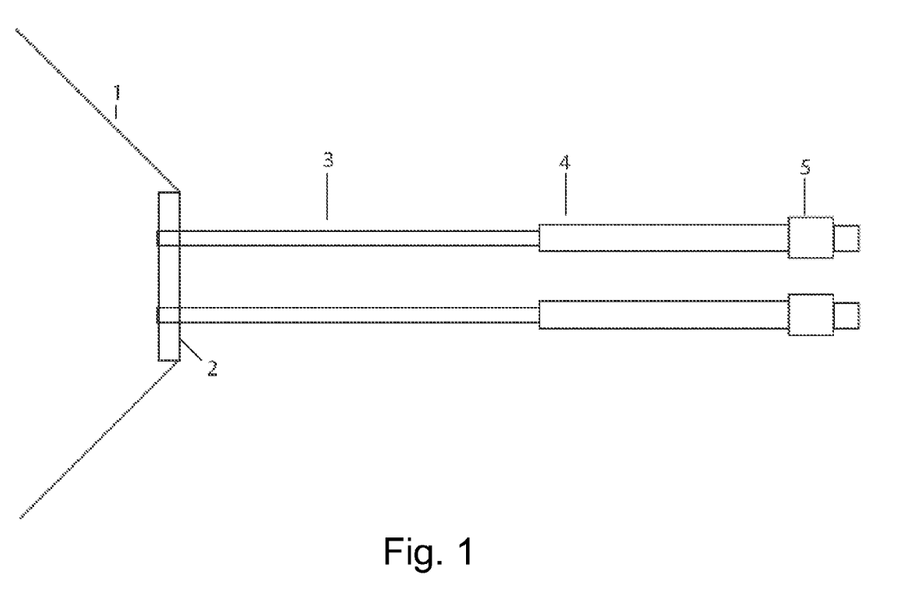
FIG. 1 shows a preferred embodiment of the invention in which two light guides are affixed in front of a camera stroboscopic illuminator.

As shown in FIG. 1, an adapter for an on-camera TTL metered flash is provided having two fiber optic conduits.

A mounting fabric 1 is provided for shielding the output of the flash which does not exit through the light guide. The mounting fabric 1 is affixed to the fiber optic mounting plate 2 at its edge, and is typically formed of a reflective (e.g., aluminized) or black fabric.

A Fiber Optic mounting plate 2 is designed to sit in front of a plastic lens covering and protecting the flash tube of the camera, not shown. The fiber optic mounting plate 2 is typically rectangular, having a corresponding size and shape to a typical plastic lens. In order to make the adapter generic for many camera designs, it is relatively small, for example 2 cm by 1 cm, and formed having a reflective surface.

The fiber optic mounting plate 2 may be held in place in front of the flash with a temporary adhesive or tacky material, or a permanent adhesive with a secondary fastening means, such as Velcro®. Typically, it is preferred not to permanently modify or deface the camera, nor obstruct the normal flash output when the adapter is removed, so a temporary adhesive is preferred. For example, a sticky silicone seal material may be provided at the edge of the mounting plate 2. In other cases, a permanent affixing of the adapter is desired, and the camera may thereafter be dedicated to macrophotography use.

An entrance aperture of each fiber optic cable 3 passes through the mounting plate 2 and generally is close to or in contact with the plastic lens covering the flash. In some cases, it may be desirable to provide an index matching viscous fluid or gel between the entrance aperture and the plastic lens to improve light transmission. In general, this is not necessary.

The fiber optic cables 3 have, at a distal end, a metal gooseneck sheathing 4 or other suitable self-supporting structure, which terminates in a fiber optic ferrule 5. The metal gooseneck sheathing 4 and fiber optic ferrule 5 may be positioned and held as desired in a relative position to the lens and/or object to the illuminated. The fiber optic ferrule may also have associated with it aiming or modeling optics, such as a light emitting diode or laser diode, which may produce an output at the edge of the ferrule, outside the fiber optic cable 3, or at its center. The metal gooseneck sheathing 4 or other suitable self-supporting structure is adapted to maintain the fiber optic ferrule 5 in position after positioning, resisting gravitational and mild inertial influences. Typical structures display mechanical hysteresis, having a high initial force required to produce a movement, which then drops until the movement ceases.

For example, an arm or arms (not shown) may extend from a camera tripod to support and position the metal gooseneck 4 near its proximal end. Alternately, a plate may be mounted to the camera at the tripod mounting point, extending outward in the direction of the lens.

The fiber optic cables 3 may also be adhered to the plastic lens covering the flash tube or the body of the camera with a suction cup or suction cups. Thus, for example, each fiber optic cable 3 may be inserted through the center of a suction cup, allowing, for example, three fiber optic cables 3 to be mounted on the camera flash. Of course, the number of cables is limited by the size of each cable and the size of the flash plastic lens, unless a spacer is provided to increate the input aperture size of the array of cables. Alternately, a bundle of fibers may be optically coupled to the flash output at or near the plastic lens, and then divided into separate bundles.

The suction cups may be formed, for example, of a black or aluminized plastic or rubber, to block stray light. This method of attaching a single or small bifurcated fiber optic conduit, via a suction cup or small removable mounting plate, allows inexpensive or general purpose consumer cameras that have only a small built in flash to be used for macro photography.

Figure 2:
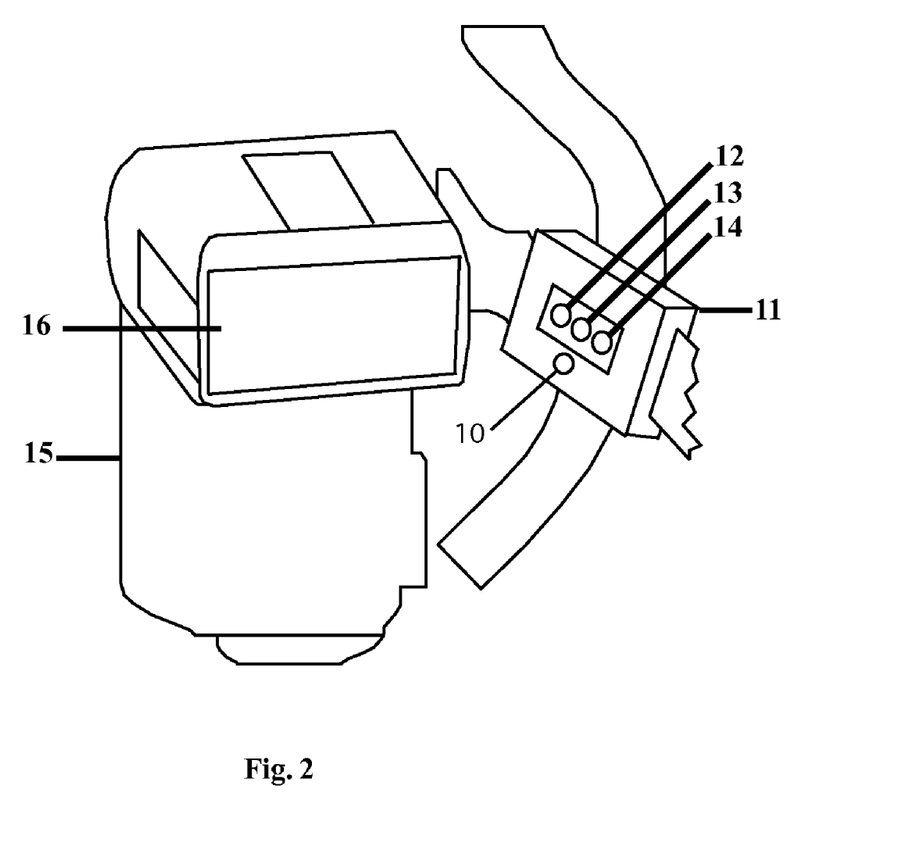
FIG. 2 shows a mounting plate of second embodiment of the invention in which fiber optic conduits are secured, for attachment to a camera flash unit.
Figure 3:
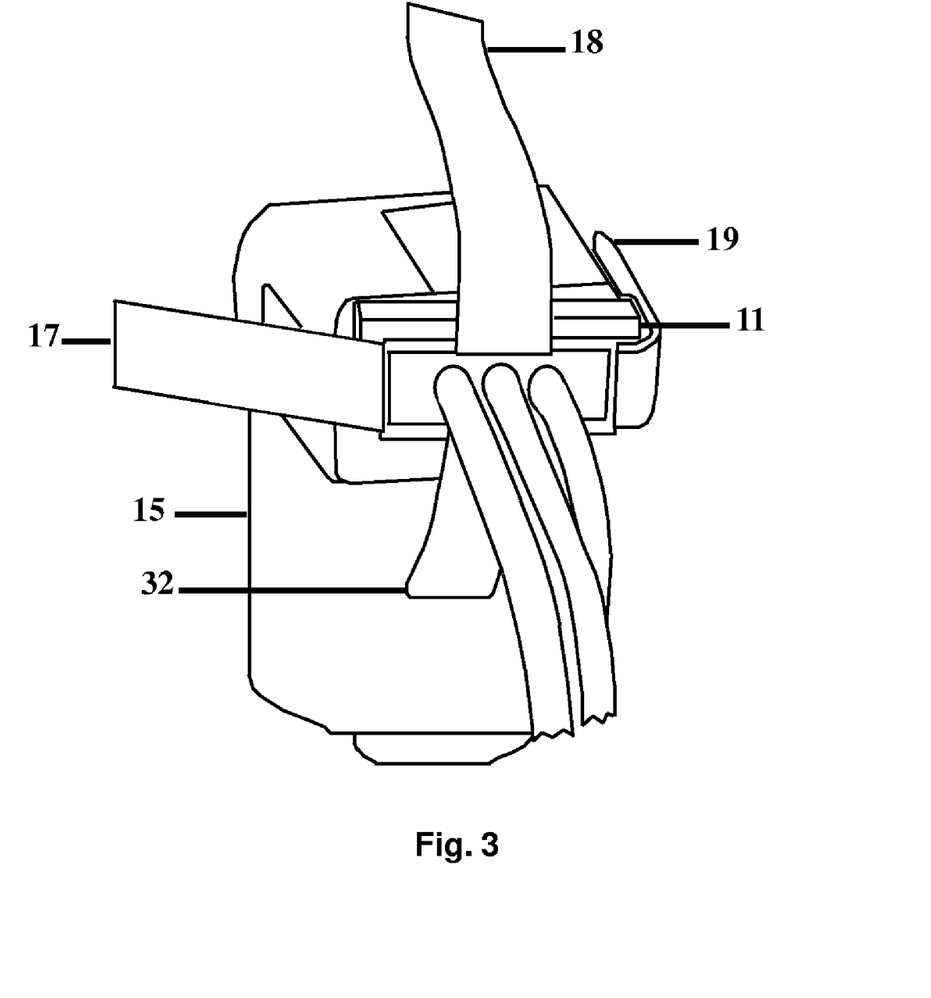
FIG. 3 shows the mounting plate of FIG. 2 removably attached to the camera flash unit using hook-and-loop fastener strips.

FIGS. 2-6 show aspects of a second embodiment of the invention. FIG. 2 shows a mounting plate 11 of second embodiment of the invention in which fiber optic conduits 12, 13, 14 are secured, for attachment to a camera flash unit 15, having an illumination port 16. FIG. 3 shows the mounting plate 11 removably attached to the camera flash unit 15 using hook-and-loop fastener strips 17, 18, 19, 32. The mounting plate is, for example, formed of machined aluminum, with a reflective face adjacent to the flash unit 15 illumination port 16. Through this same port, illumination from both a stroboscopic illuminator and a continuous illuminator 10 may be presented, in a region aligned with an optical axis of each flexible light guide. The continuous illuminator 10 may be, for example, provided on the mounting plate 11 and project inward through the illumination port 16, and then reflecting outward again toward the fiber optic conduits 12, 13, 14.

Figure 4:
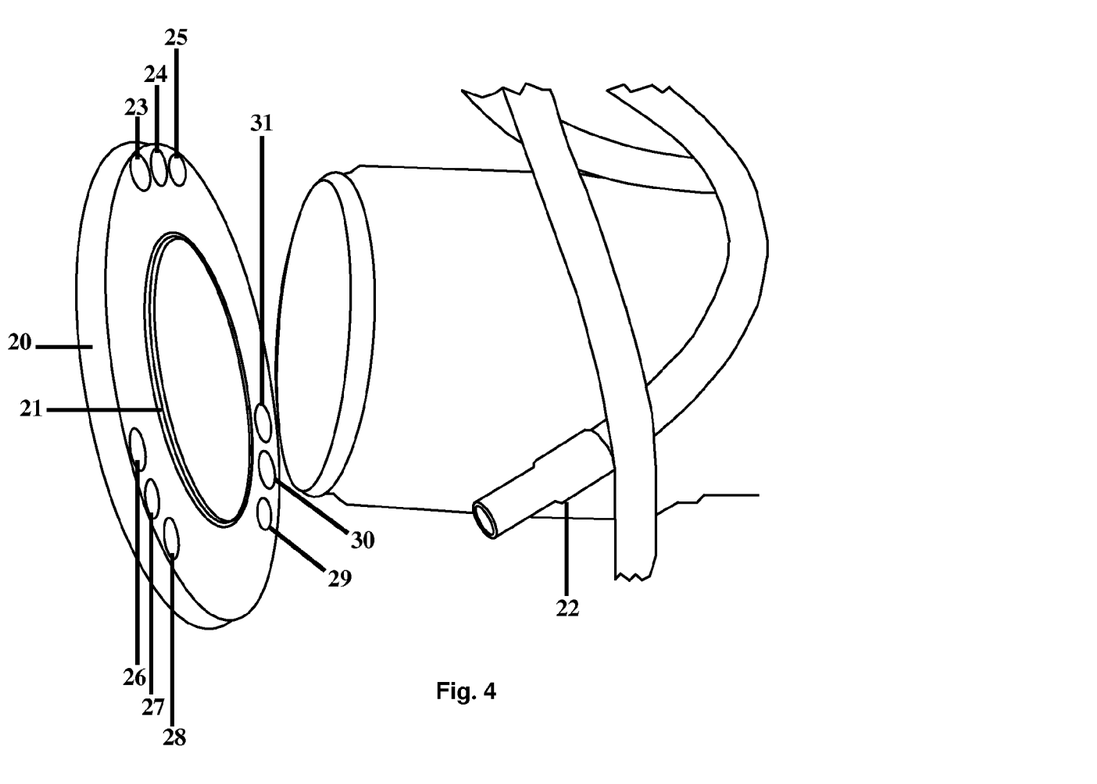
FIG. 4 shows a mounting ring that attaches directly to a filter retention thread of a camera lens, in which the mounting ring has a set of apertures.

FIG. 4 shows a mounting ring 20 that attaches directly to a filter retention thread 21 of a camera lens 22. The mounting ring 20 has a set of apertures 23, 24, 25, 26, 27, 28, 29, 30, 31, arranged in three sets of three, at 120 degrees respective separation. Within each group of three, a first aperture 23, 26, 29 has walls aligned with (zero degrees) the optical axis of the camera lens 22, a second aperture 24, 27, 30 is inclined at 12 degrees toward the optical axis, and a third aperture 25, 28, 31 is inclined at 24 degrees toward the optical axis. This configuration allows the user to select variable and or multiple angles of incident light in order to properly illuminate a variety of subject matter. Of course, additional apertures, at different angles could be provided. It is also possible to have adjustable angle apertures, using a locking pivoted sub-carrier.

Figure 5:
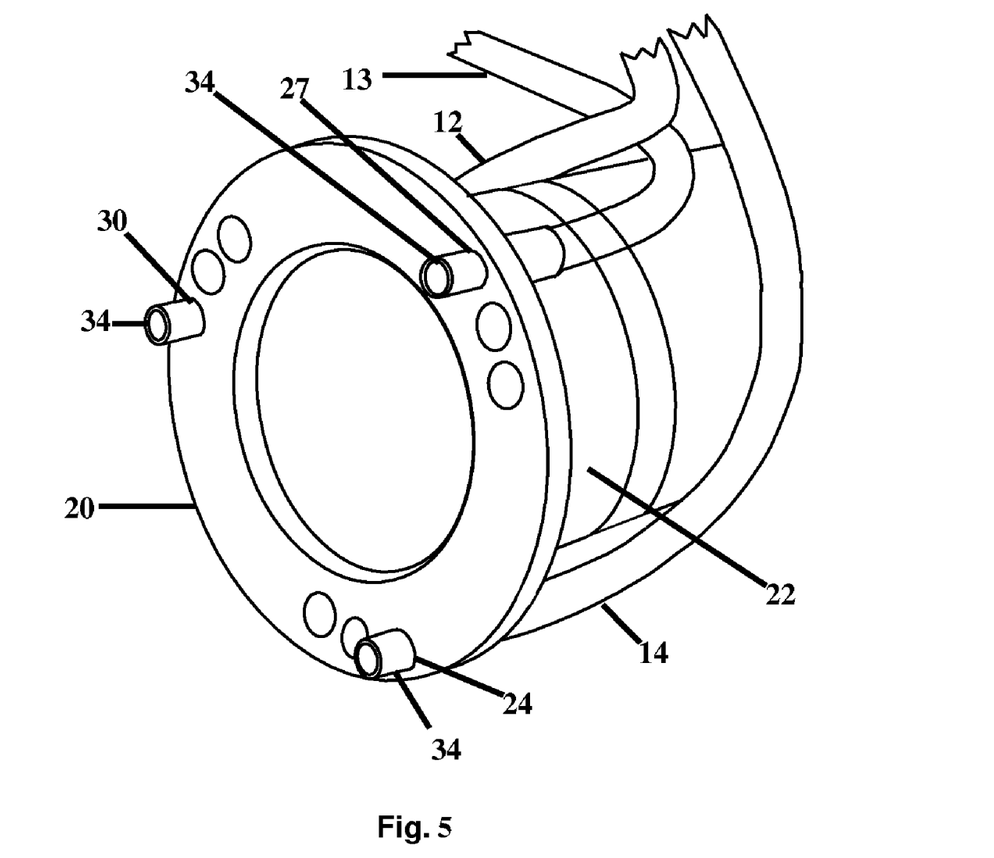
FIG. 5 shows the mounting ring of FIG. 4 attached to a camera lens, with the ferrules of the fiber optic conduits secured in the apertures.
Figure 6:
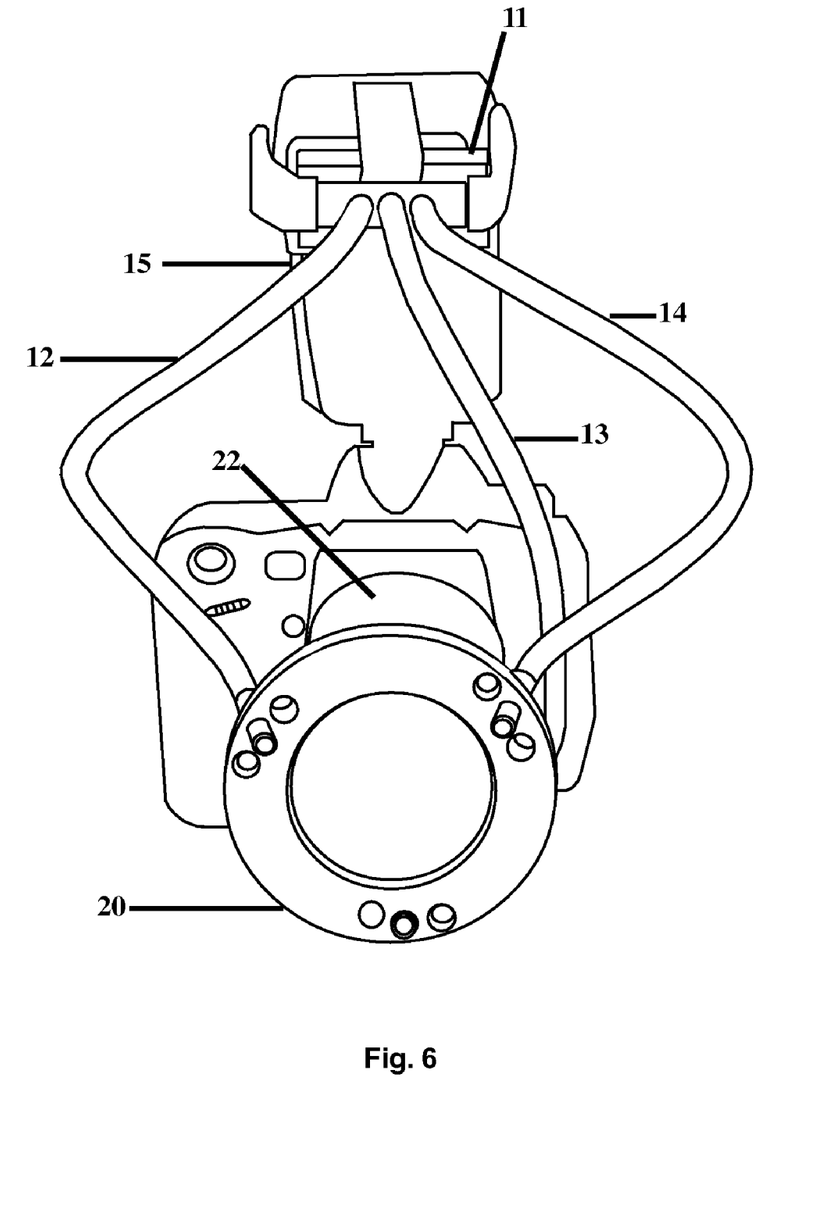
FIG. 6 shows the camera flash with mounting plate attached, fiber optic conduits, and mounting ring mounted on the camera lens, ready for use.

FIG. 5 shows the mounting ring 20 attached to the camera lens 22, with the ferrules 34 of the fiber optic conduits 12, 13, 14 secured in the apertures 24, 27, 30. FIG. 6 shows the camera flash 15 with mounting plate 11 attached, fiber optic conduits 12, 13, 14, and mounting ring 20 mounted on the camera lens 22, ready for use. In this configuration, each fiber optic conduit 12, 13, 14 is approximately fourteen inches long, so that it may accommodate a variety of macro lenses. The bundles are sufficiently flexible so they may contract back when using a short lens and not interfere with the cameras operation or ability to auto focus.

The system was used to photograph untreated fingerprints. The ferrules of the fiber optic conduits 12, 13, 14 are held facing straight ahead (at 0 degrees with respect to the optical axis), the camera was hand held directly over a fingerprint at a distance of approximately 11.0 inches. Because finger prints are themselves raised from the supporting surface, light bouncing in from the sides illuminates the peaks of the print ridges, while shadows fill the valleys. The flash adapter can direct an illumination field around an object completely surrounding it with a somewhat controlled angle of illumination.

There has thus been shown and described novel illuminators and novel aspects of illumination systems, which fulfill all the objects and advantages sought therefore. Many changes, modifications, variations, combinations, subcombinations and other uses and applications of the subject invention will, however, become apparent to those skilled in the art after considering this specification and the accompanying drawings which disclose the preferred embodiments thereof.

All such changes, modifications, variations and other uses and applications which do not depart from the spirit and scope of the invention are deemed to be covered by the invention, which is to be limited only by the claims which follow.

What is claimed is:

1. An illumination system for a camera system comprising a lens and a stroboscopic illuminator having an illumination port, comprising:
    a removable mounting adapted to be positioned at the illumination port;
    a plurality of flexible light guides, connected to said mounting, each having an entrance aperture positioned to receive light from the illumination port;
    each light guide having an exit aperture independently positionable with respect to each other, distal from the entrance aperture, adapted to illuminate a respective region proximate to the lens;
    a positioning fixture which maintains the independently positionable exit aperture of the at least one light guide in a respective different user-selectable position with respect to the lens; and
    the removable mounting comprises a continuous illumination source, wherein the continuous illumination source illuminates the stroboscopic illuminator such that light from the continuous illumination source is reflected by a reflector of the stroboscopic illuminator and enters the entrance aperture of the plurality of flexible light guides.

2. The illumination system according to claim 1, wherein the flexible light guides each comprise a fiber optic bundle.

3. The illumination system according to claim 1, wherein the positioning fixture comprises a self-supporting shell associated with the flexible light guide, adapted to maintain the flexible light guides each in a user-defined position when subjected to gravitational forces.

4. The illumination system according to claim 1, wherein the mounting is attached to the stroboscopic illuminator with a hook-and-loop fastener.

5. The illumination system according to claim 1, wherein the stroboscopic illuminator is on-camera.

6. The illumination system according to claim 1, wherein the stroboscopic illuminator is separable from the camera.

7. The illumination system according to claim 1, wherein the plurality of flexible light guides comprise three flexible light guides.

8. The illumination system according to claim 7, further comprising at least one light modulator to vary a relative amount of light emitted from the at least two flexible light guides.

9. The illumination system according to claim 1, wherein the plurality of flexible light guides comprise at least three flexible light guides.

10. The illumination system according to claim 9, further comprising a light modulator to selectively vary a relative amount of light emitted from the at least three flexible light guides.

11. The illumination system according to claim 1, further comprising an auxiliary illuminator operable independently from the stroboscopic illuminator, adapted to provide illumination in a region proximate to the lens.

12. The illumination system according to claim 11, wherein the auxiliary illuminator is controlled in conjunction with the stroboscopic illuminator.

13. The illumination system according to claim 11, wherein the auxiliary illuminator produces continuous illumination.

14. The illumination system according to claim 1, wherein at least three flexible light guides are positioned by the mounting at the illumination port in a linear array, such that the respective entrance aperture of each flexible light guide intersects a portion of the illumination port.

15. A light guide adapter for a camera having a lens and a stroboscopic illuminator having an output, comprising:
   a removable mounting adapted to mate with a stroboscopic illuminator output;
   a plurality of flexible light guides, connected to said mounting, each having an entrance aperture positioned to receive light from the stroboscopic illuminator output, each light guide having an exit aperture, distal from the entrance aperture, independently positionable with respect to each other, and being adapted to illuminate a respectively different region proximate to the lens, each light guide having a respective independent position of the independently repositionable exit aperture which is maintained under gravitational influences after positioning; and
   the removable mounting comprises a continuous illumination source, wherein the continuous illumination source illuminates the stroboscopic illuminator such that light from the continuous illumination source is reflected by a reflector of the stroboscopic illuminator and enters the entrance aperture of the plurality of flexible light guides.

16. The adapter according to claim 15, wherein the mounting is removable and the plurality of light guides are flexible, further comprising a mounting fixture which mechanically supports the exit apertures of the plurality of flexible light guides in a respective independently selected position.

17. An illumination method, comprising:
   mounting a removable fixture having a continuous illumination source to a stroboscopic illuminator output;
   providing a plurality of flexible light guides, on the removable fixture, each having an entrance aperture positioned to receive light from the stroboscopic illuminator output;
   continuously illuminating the stroboscopic illuminator with the continuous illumination source such that light from the continuous illumination source is reflected by a reflector of the stroboscopic illuminator and enters the entrance aperture of the plurality of flexible light guides;
   independently positioning an exit aperture distal from the entrance aperture of each of the plurality of light guides with respect to each other;
   illuminating a region proximate to the lens through the plurality of light guides, with the stroboscopic illuminator output; and
   maintaining a position of the exit aperture of the plurality of light guides under gravitational influences after the independently positioning, during said illuminating.

18. The method according to claim 17, wherein each of the plurality of light guides has a self-supporting shell adapted to maintaining a position of the exit aperture of the plurality of light guides under gravitational influences after the independently positioning.

\* \* \* \* \*